(12) United States Patent
Bartlit, Jr.

(10) Patent No.: US 7,640,168 B2
(45) Date of Patent: Dec. 29, 2009

(54) METHOD AND COMPUTER PROGRAM PRODUCT FOR ENABLING CUSTOMERS TO ADJUST THE LEVEL OF SERVICE PROVIDED BY SERVICE PROVIDERS

(76) Inventor: Fred H. Bartlit, Jr., 604 Cliffgate La., Castle Rock, CO (US) 80108

( * ) Notice: Subject to any disclaimer, the term of this patent is extended or adjusted under 35 U.S.C. 154(b) by 0 days.

(21) Appl. No.: 10/793,667

(22) Filed: Mar. 5, 2004

(65) Prior Publication Data

US 2004/0230450 A1    Nov. 18, 2004

Related U.S. Application Data

(60) Provisional application No. 60/452,063, filed on Mar. 6, 2003.

(51) Int. Cl.
*G06Q 10/00* (2006.01)
*G06Q 30/00* (2006.01)
*G06F 17/30* (2006.01)

(52) U.S. Cl. .............................. 705/1; 705/26; 705/27

(58) Field of Classification Search .................. 705/1, 705/5, 8, 9, 26, 27, 29, 30, 32, 39, 40, 412, 705/2, 4; 709/203, 206, 219; 707/E17.032, 707/3, 10, 104.1; 725/38, 39; 700/19, 276; 340/3.1, 523, 517
See application file for complete search history.

(56) References Cited

U.S. PATENT DOCUMENTS

| | | | | |
|---|---|---|---|---|
| 5,309,509 A | * | 5/1994 | Cocklin et al. | 379/165 |
| 5,357,170 A | * | 10/1994 | Luchaco et al. | 315/159 |
| 5,462,225 A | * | 10/1995 | Massara et al. | 236/47 |
| 5,650,994 A | * | 7/1997 | Daley | 370/259 |
| 5,696,906 A | * | 12/1997 | Peters et al. | 705/34 |
| 6,055,570 A | * | 4/2000 | Nielsen | 709/224 |
| 6,072,862 A | * | 6/2000 | Srinivasan | 379/100.08 |
| 6,088,659 A | * | 7/2000 | Kelley et al. | 702/62 |
| 6,360,254 B1 | * | 3/2002 | Linden et al. | 709/219 |
| 6,528,957 B1 | * | 3/2003 | Luchaco | 315/307 |
| 6,738,908 B1 | * | 5/2004 | Bonn et al. | 726/4 |

(Continued)

FOREIGN PATENT DOCUMENTS

JP    362000760 A * 1/1987

OTHER PUBLICATIONS

INSURANCE.COM; Internet print-out; Dec. 2001; 4 Pages.*

(Continued)

*Primary Examiner*—Igor N Borissov
(74) *Attorney, Agent, or Firm*—Sterne, Kessler, Goldstein & Fox PLLC (57) ABSTRACT

Systems, methods, and computer program products for providing services, and for enabling changes in the services, are described herein. The services are, for example, continuous, recurring, and/or periodic, and include utility service, periodical delivery service, insurance, etc., and combinations thereof. Customers can issue instructions to service providers (over the Internet, for example) to modify services being provided to the customer. Upon receipt of those instructions, a corresponding service provider takes appropriate action to adjust the service in accordance with the instructions. Customers may also define Service Adjustment Triggers, which specify one or more conditions and one or more changes to the service. Occurrence of the conditions results in implementation of the changes.

14 Claims, 13 Drawing Sheets

U.S. PATENT DOCUMENTS

| | | | |
|---|---|---|---|
| 2002/0010611 A1* | 1/2002 | Yamaji et al. | 705/8 |
| 2002/0023057 A1* | 2/2002 | Goodwin et al. | 705/50 |
| 2002/0042915 A1* | 4/2002 | Kubischta et al. | 725/38 |
| 2002/0049815 A1* | 4/2002 | Dattatri | 709/206 |
| 2002/0052952 A1* | 5/2002 | Yoshida et al. | 709/225 |
| 2002/0099565 A1* | 7/2002 | Kito | 705/1 |
| 2002/0103655 A1* | 8/2002 | Boies et al. | 705/1 |
| 2002/0165729 A1* | 11/2002 | Kuebert et al. | 705/1 |
| 2003/0040946 A1* | 2/2003 | Sprenger et al. | 705/6 |
| 2003/0055882 A1* | 3/2003 | Kawamura | 709/203 |
| 2003/0093332 A1* | 5/2003 | Spool et al. | 705/26 |
| 2003/0149781 A1* | 8/2003 | Yared et al. | 709/229 |
| 2003/0158790 A1* | 8/2003 | Kargman | 705/26 |
| 2003/0216995 A1* | 11/2003 | DePauw et al. | 705/37 |
| 2004/0133487 A1* | 7/2004 | Hanagan et al. | 705/34 |
| 2004/0153362 A1* | 8/2004 | Bauer et al. | 705/10 |
| 2004/0230437 A1 | 11/2004 | Havrilak | |
| 2004/0230438 A1 | 11/2004 | Pasquale et al. | |
| 2004/0230439 A1 | 11/2004 | Aptekar | |
| 2004/0230440 A1 | 11/2004 | Malhotra | |
| 2004/0230441 A1 | 11/2004 | Reilly | |
| 2004/0230442 A1 | 11/2004 | Wookey | |
| 2004/0230443 A1 | 11/2004 | McMorris et al. | |
| 2004/0230444 A1 | 11/2004 | Holt et al. | |
| 2004/0230445 A1 | 11/2004 | Heinzel et al. | |
| 2004/0230446 A1 | 11/2004 | Park et al. | |
| 2004/0230447 A1 | 11/2004 | Schwerin-Wenzel et al. | |
| 2004/0230448 A1 | 11/2004 | Schaich | |
| 2004/0230449 A1 | 11/2004 | Franks | |
| 2005/0022027 A1* | 1/2005 | Bonn et al. | 713/201 |
| 2005/0038675 A1* | 2/2005 | Siekman et al. | 705/2 |
| 2005/0080496 A1* | 4/2005 | Hayes et al. | 700/65 |
| 2005/0261986 A1* | 11/2005 | Haynes et al. | 705/26 |
| 2006/0053066 A1* | 3/2006 | Sherr et al. | 705/26 |

OTHER PUBLICATIONS

Screen capture from U.S. Postal Service web site, https://dunsapp.usps.gov/HoldMail.jsp, 1 page, printed Feb. 1, 2005.

* cited by examiner

METHOD AND COMPUTER PROGRAM PRODUCT FOR ENABLING CUSTOMERS TO ADJUST THE LEVEL OF SERVICE PROVIDED BY SERVICE PROVIDERS

CROSS-REFERENCE TO RELATED APPLICATIONS

This application claims priority to U.S. Provisional Application No. 60/452,063, filed Mar. 6, 2003, entitled "System, Method, And Computer Program Product For Enabling Customers To Adjust The Level Of Service Provided By Service Providers," which is incorporated herein by reference in its entirety.

BACKGROUND OF THE INVENTION

1. Field of the Invention

Generally, the invention is directed to the provision of services. More particularly, the invention is directed to systems, methods, and computer program products for enabling customers to modify/adjust the level of service provided by service providers.

2. Related Art

Service providers provide services to customers. Generally, such services are continuous, recurring, and/or periodic, and include telephone, electricity, gas, water, Internet access, newspaper delivery, automobile insurance, cable television, etc.

Conventionally, while a given service is active, the customer often has little ability to make changes to the service. The customer is capable of terminating the service, but cannot otherwise adjust or change the provision of service short of termination.

Also, even when changes are possible, the customer is restricted in the way that changes can be made. For example, the customer might be able to temporarily discontinue newspaper deliver (during a vacation, for example), but only by interacting with a human operator over the telephone, or via a letter to the service provider. Such conventional means for interacting with service providers are often inconvenient, inefficient, and/or untimely, and effectively discourage customers from trying to modify the level of services provided to them.

As a result, oftentimes service providers provide services to customers even though the customers are not able to use or enjoy the services. This is wasteful and costly.

Therefore, what is required is a system, method and computer program product for enabling customers to more conveniently, effectively and efficiently modify the services provided to them by service providers.

BRIEF SUMMARY OF THE INVENTION

Briefly stated, the invention is directed to a system, method, and computer program product for providing services, and for enabling changes in the services. The services are, for example, continuous, recurring, and/or periodic, and include utility service, periodical delivery service, insurance, etc., and combinations thereof.

The invention allows customers to issue instructions to service providers (over the Internet, for example) to modify services being provided to the customer. Upon receipt of those instructions, a corresponding service provider takes appropriate action to adjust the service in accordance with the instructions.

The invention allows customers to define Service Adjustment Triggers, which specify one or more conditions and one or more changes to the service. Occurrence of the conditions results in implementation of the changes. In particular, the invention monitors and determines whether the conditions associated with the Service Adjustment Trigger have occurred. If they have, then the changes to the service specified by the Service Adjustment Trigger are made.

Service providers determine whether rate schedule charges are appropriate after a change is made to a customer's service. For example, a reduction in the level of service provided to the customer will typically result in a reduction in the rate schedule applicable to the customer (although this is implementation and service specific).

In at least some instances, service providers charge a surcharge or some other fee for changing the level of a customer's service pursuant to commands and instructions of the customer. Service providers may also charge a customer when the customer defines or modifies a Service Adjustment Trigger.

Further embodiments, features, and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art(s) to make and use the invention.

DETAILED DESCRIPTION OF THE INVENTION

Figure 1:
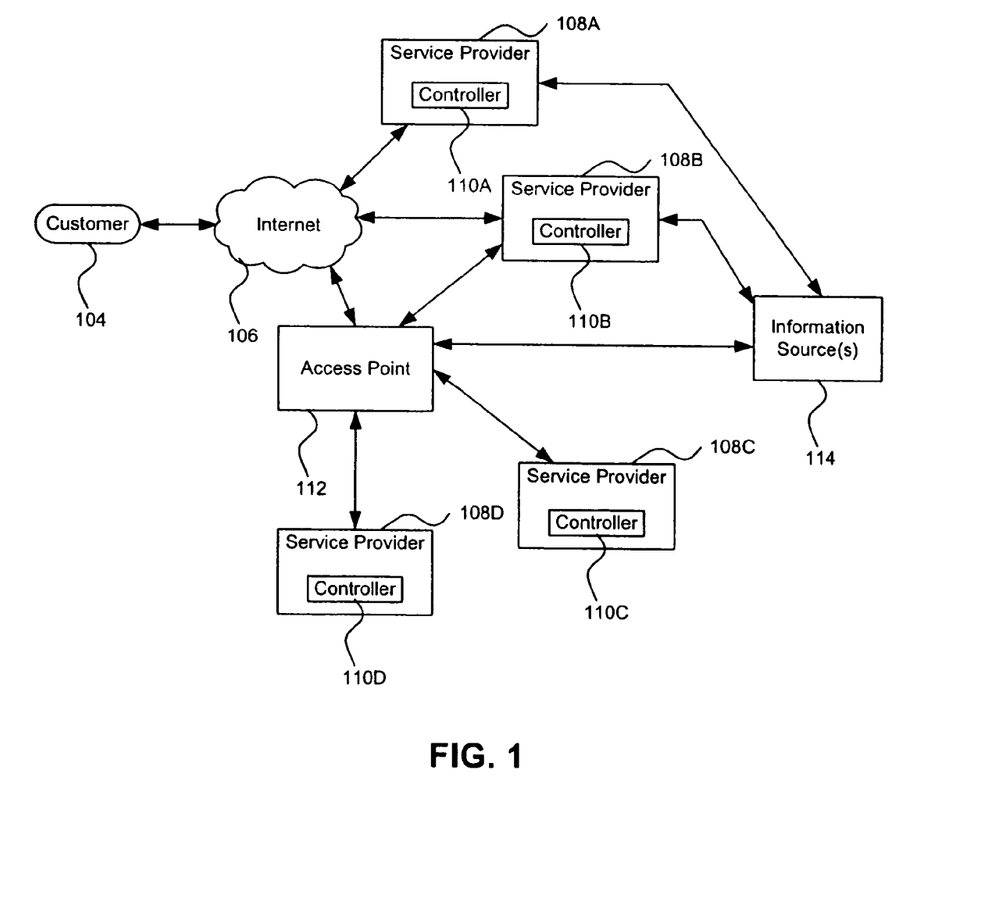
FIG. 1 is a block diagram of an environment applicable to embodiments of the invention.

FIG. 1 illustrates an environment 102 according to an embodiment of the invention. In the example of FIG. 1, a number of service providers 108 provide various services to customers, such as customer 104. Although only four service providers 108A, 108B, 108C, and 108D are shown in FIG. 1, in practice any number of service providers 108 may provide services to customer 104.

Generally, the services provided by service providers 108 include services which are continuous and/or recurring, such as newspaper and/or magazine delivery (as well as other types of subscriptions), automobile and/or home insurance (as well as other types of insurances), cable TV, electricity, gas, water (as well as other types of utilities), internet access, etc. Other types of services applicable to the invention will be apparent to persons skilled in the relevant arts based on the teachings contained herein, and are within the scope and spirit of the present invention.

According to the present invention, the customer 104 may directly or indirectly access and interact with the service providers 108. In an embodiment, such access is achieved through communication means and methods that do not require the customer 104 to interact with human operators (although embodiments of the invention do not prohibit the customer from interacting with human operators, at least during some operational stages of the invention). Communication means and methods applicable for use with the invention include any type of communication network, such as the Internet 106. Other forms and methods of communication are possible, including dial-up computer connection, wired and/or wireless connections, communication via cell phones, communication via personal data assistants (PDA), etc.

The customer 104 interacts with the service providers 108 in order to modify and/or adjust the level of service provided by the service providers 108 to the customer 104. For example, consider the example where service provider 108A is a newspaper company to which the customer 104 subscribes. In order to avoid receiving newspapers while on vacation, the customer 104 may interact with service provider 108A via Internet 106 to temporarily discontinue his newspaper delivery service.

Consider another example where service provider 108B is the telephone company. In a similar matter, customer 104 may interact with service provider 108B via Internet 106 to temporarily discontinue his telephone service.

Another example involves automobile insurance. Assume the customer 104 has a daughter who is under the customer's auto insurance policy. The daughter is in college, and while at college does not have access to a car. Under these circumstances, the customer 104 may wish to temporarily discontinue the automobile insurance for his daughter while she is at college. Accordingly, the customer 104 can interact with the service provider 108D (the automobile insurance company) via the Internet 106 to temporarily discontinue his daughter's automobile insurance.

Accordingly, the invention enables customers to temporarily discontinue provision of services to them during times when such services would be unused. More generally, the invention enables customers to adjust the level of service provided to them to match their circumstances, desires, or goals.

The invention reduces waste of such services (and the resources associated with provision of such services). In an embodiment, the service providers 108 adjust the customer 104's invoices in relation to the change in provision of services to the customer 104, thereby resulting in a cost savings to the customer 104. In an embodiment, the service providers 108 impose a surcharge or convenience fee whenever the customer 104 changes his service level, thereby resulting in revenue to the service providers 108.

The invention envisions a number of ways for the customer 104 to interact with service providers 108. For example, the customer 104 may directly interact with some service providers 108A and 108B via the Internet 106. Alternatively, the customer 104 may interact with some service providers 108C and 108D via an intermediary such as access point 112. For example, access point 112 may be a web site that enables convenient, single point access to a number of service providers 108C, 108D.

In an embodiment, the service providers 108 each includes a controller 110 which enables access and interaction with customer 104, as described herein.

Figure 9:
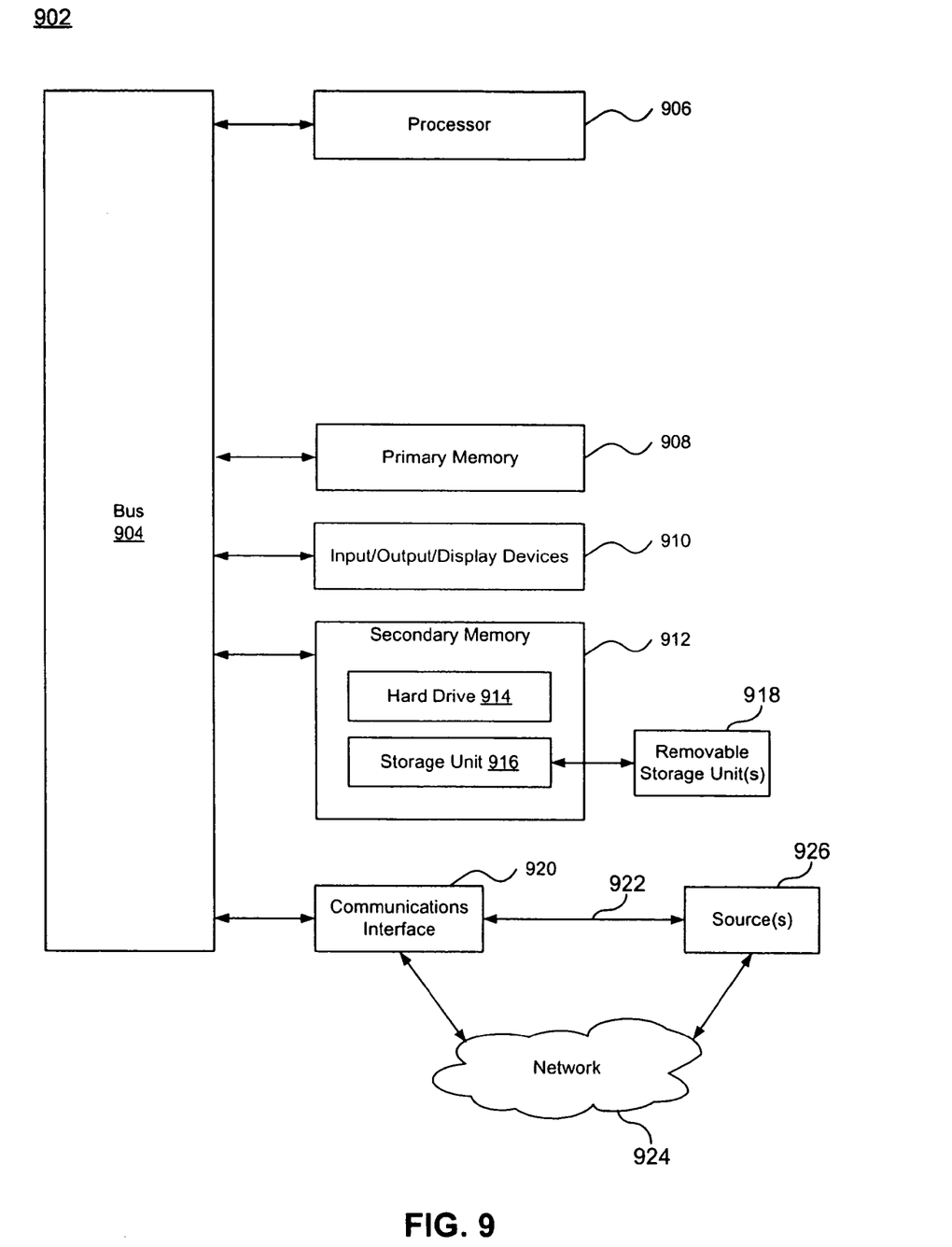
FIG. 9 is a block diagram of an example data processing device useful for implementing modules of the invention.

FIG. 9 illustrates an example computing device 902 useful for implementing components of the invention, such as but not limited to the controllers 110, the access points 112, and the information sources 114, as well as the computing devices (computers, PDAs, cell phones, etc.) used by customer 104 to access service providers 108.

The computing device 902 includes one or more processors 906 in communication with a communication bus 904. The computing device 902 includes primary memory 908, e.g., random access memory (RAM). The computing device 902 further includes input/output/display devices 910, such as monitors, keyboards, mice, scanners, barcode readers, etc.

The computing device 902 includes secondary memory 912, such as hard drives 914 and storage units 916. The storage units 916 interact with removable storage units 918, such as floppy disks, CDs, DVDs, magnetic tapes, optical storage units, etc.

The processor 906 operates according to control logic, such as software. Such software causes the computing device 902 to operate as described herein.

The software may be stored in any number of mediums or modules (referred to as computer program products), such as primary memory 908, input/output/display devices 910, secondary memory 912, removable storage units 918, etc.

The computing device 902 also includes a communications interface 920 for interacting with various remote sources 926. The communications interface 920 interacts with the sources 926 via a computer network, such as computer network 924, or via any other communication means or mediums 922. Control logic may be transferred between sources 926 and communications interface 920 via signals transferred via the network 924 or other means 922. Such signals, when carrying control logic, are also referred to as computer program products.

As noted above, in an embodiment, the invention operates according to control logic (software) executed in data processing devices, such as computing device 902. Alternatively, the invention can be implemented using hardware (such as but not limited to hardware state machines), firmware, or combinations of same with or without software.

Operational Description—User Perspective

Figure 2:
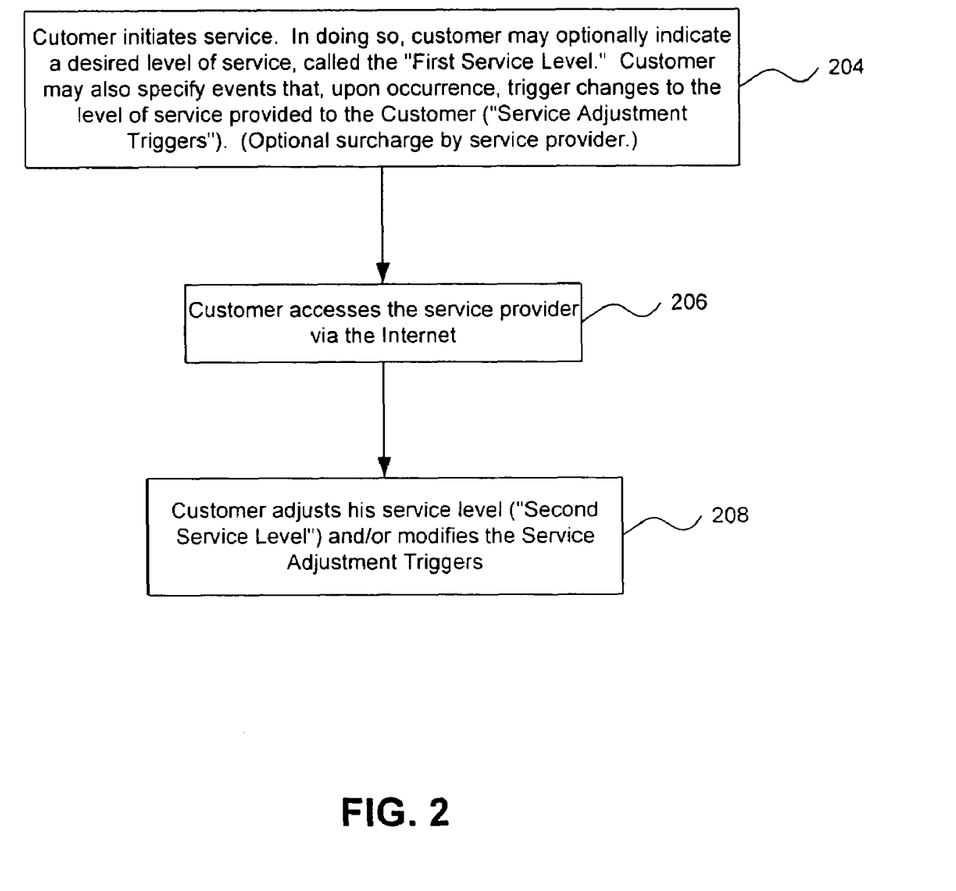
FIGS. 2-4 and 8 are flowcharts illustrating the operation of embodiments of the invention.

FIG. 2 illustrates a flowchart 202 representing the operation of the customer 104 when interacting with service providers 108. In step 204, the customer 104 initiates service with a service provider 108. In doing so, the customer 104 may optionally indicate a desired level of service, which is referred to as the "First Service Level." In an example where the customer 104 is initiating newspaper delivery service, the First Service Level may specify that newspapers should be delivered every day of the week. When the service is related to automobile insurance, the First Service Level may specify that all persons in the customer 104's family should be covered by the automobile insurance policy.

Also in step 204, the customer 104 may specify events that, upon occurrence, trigger changes to the level of service provided to the customer 104 by the service providers 108. These triggers are called "Service Adjustment Triggers" for reference purposes. A given service provider 108 (or intermediary or other authorized party) may charge a surcharge to the customer 104 for each Service Adjustment Trigger that the customer 104 creates.

Figure 5:
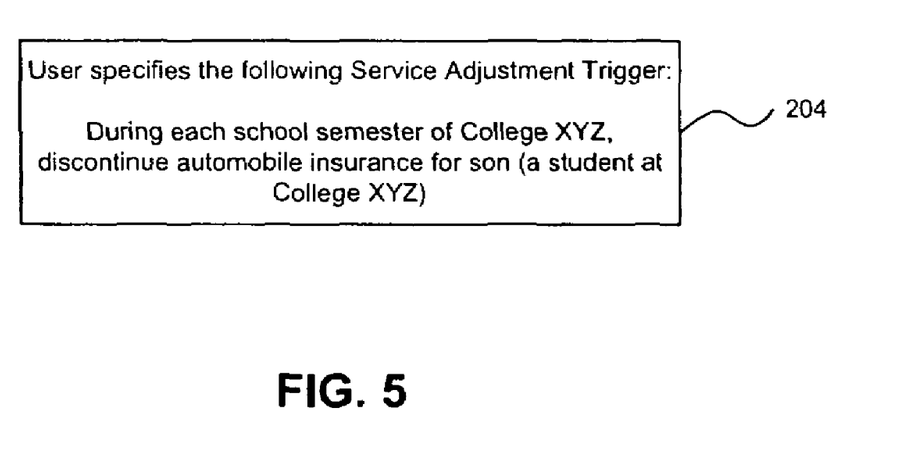
FIGS. 5-7 illustrate example Service Adjustment Triggers.
Figure 6:
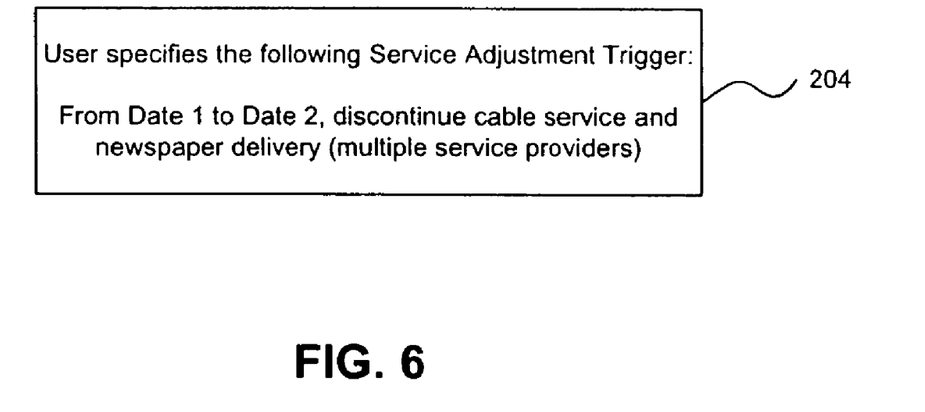
Figure 7:
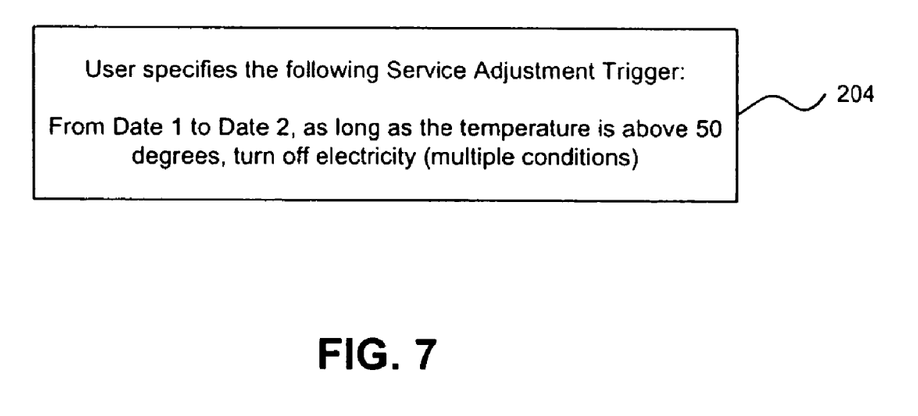

FIGS. 5-7 illustrate example Service Adjustment Triggers. FIG. 5 illustrates a Service Adjustment Trigger that relates to automobile insurance. In the example of FIG. 5, in step 204, the customer 104 defines a Service Adjustment Trigger that requires the service provider 108 to temporarily discontinue automobile insurance for his son while his son is in college.

FIG. 6 illustrates a Service Adjustment Trigger related to cable modem service and newspaper delivery service. In the example of FIG. 6, the customer 104 defines a Service Adjustment Trigger that requires service providers 108 to discontinue cable service and newspaper delivery service to customer 104 during a defined time period (that may represent a vacation, for example). As FIG. 6 illustrates, the invention envisions Service Adjustment Triggers that are directed to multiple service providers 108.

FIG. 7 illustrates a Service Adjustment Trigger related to an electricity service provider. According to this Service Adjustment Trigger, the customer 104 in step 204 defines a Service Adjustment Trigger that requires the electricity service provider 108 to discontinue his electricity service during a defined period (such as a vacation), as long as the temperature is above 50°. The example of FIG. 7 illustrates that the invention permits Service Adjustment Triggers to be based on multiple conditions.

In an embodiment, the invention processes Service Adjustment Triggers by accessing information sources 114 for information referred to in the Service Adjustment Triggers, or otherwise pertinent to the Service Adjustment Triggers. For example, when evaluating the Service Adjustment Trigger specified in FIG. 7, the particular service provider 108 accesses a source for temperature information, such as a weather web site available via the Internet 106. When evaluating the Service Adjustment Trigger specified in FIG. 5, the particular service provider 108 accesses an appropriate source to identify the dates associated with the school year for College XYZ (such as College XYZ's web site).

Returning again to FIG. 2, in step 206 the customer 104 accesses the service providers 108 via the Internet 106. The customer 104 wishes to access the service providers 108 in order to change the level of services provided by such service providers 108, or to modify or define new Service Adjustment Triggers.

Accordingly, in step 208, the customer 104 interacts with service provider(s) 108 to adjust service levels and/or modify Service Adjustment Triggers (or create new Service Adjustment Triggers).

Graphical User Interfaces

In an embodiment, the customer 104 interacts with service providers 108 (either directly or via an access point 112) via a graphical user interface (GUI). FIGS. 10-13 illustrate example GUIs contemplated by the invention, although other GUIs could be used, and such other GUIs will be apparent to persons skilled in the relevant arts.

Figure 10:
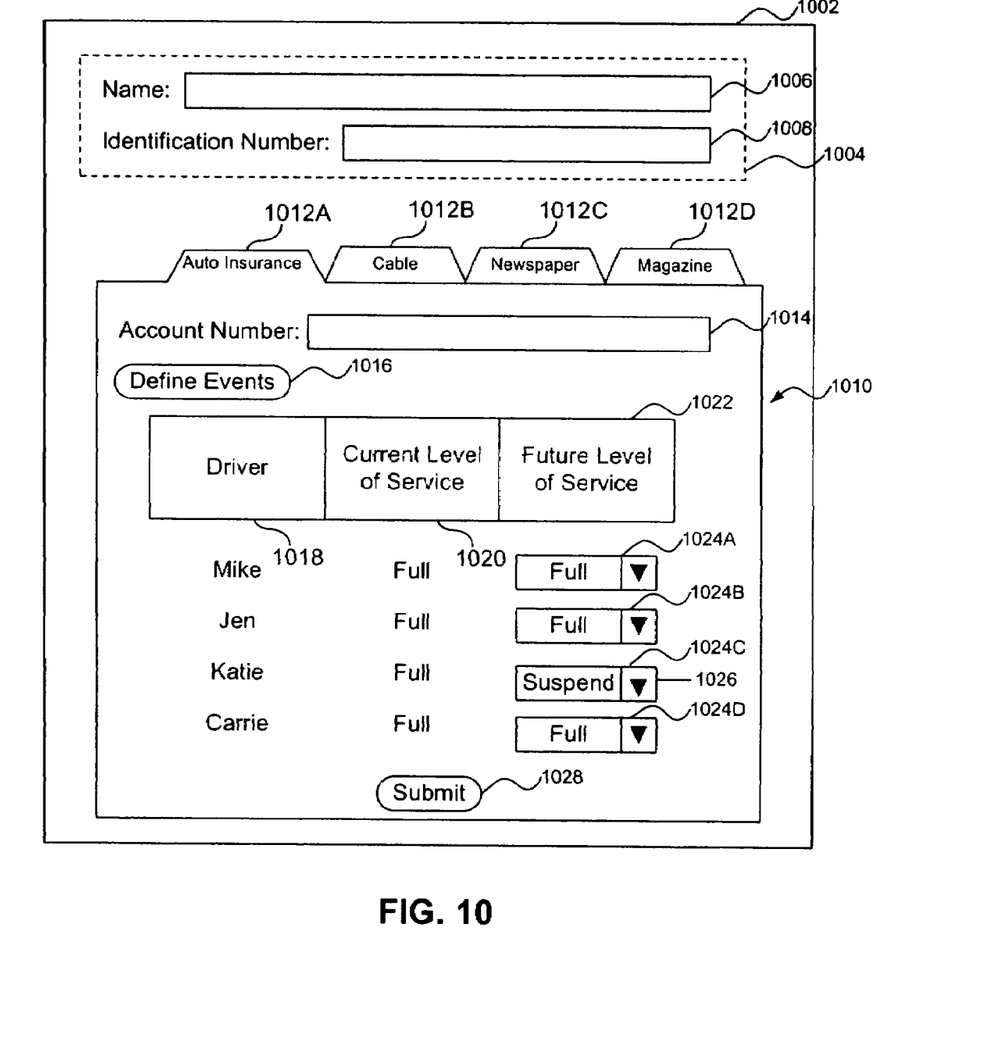
FIGS. 10-13 are example graphical user interfaces (GUIs) according to embodiments of the invention.

FIG. 10 illustrates a user GUI 1002 that includes an identification pane 1004 by which the customer 104 is identified. In an embodiment, the identification pane 1004 includes a name field 1006 and an identification (ID) number field 1008. The GUI 1002 includes a panel 1010 having a number of tabs 1012. Each tab 1012 corresponds to a particular service being provided to the customer 104. Accordingly, the panel 1010 accumulates and integrates multiple services from one or more service providers 108 for convenience purposes.

Tab 1012A corresponds to automobile insurance. Tab 1012B corresponds to cable TV service. Tab 1012C corresponds to newspaper delivery service. Tab 1012D corresponds to magazine delivery service.

Tab 1012A (automobile insurance service) will be considered for illustrative purposes. Tab 1012A includes an account number field 1014 that identifies the customer 104's insurance policy. Tab 1012A also includes a list of drivers on the policy 1018, the current level of service for each driver 1020, and means 1024 by which the customer 104 can modify the level of service for each driver. Such means 1024 comprises a drop-down menu of options 1024. In the example of FIG. 10, the customer 104 has used the drop-down menu 1024C to suspend Katie's automobile insurance.

Figure 11:
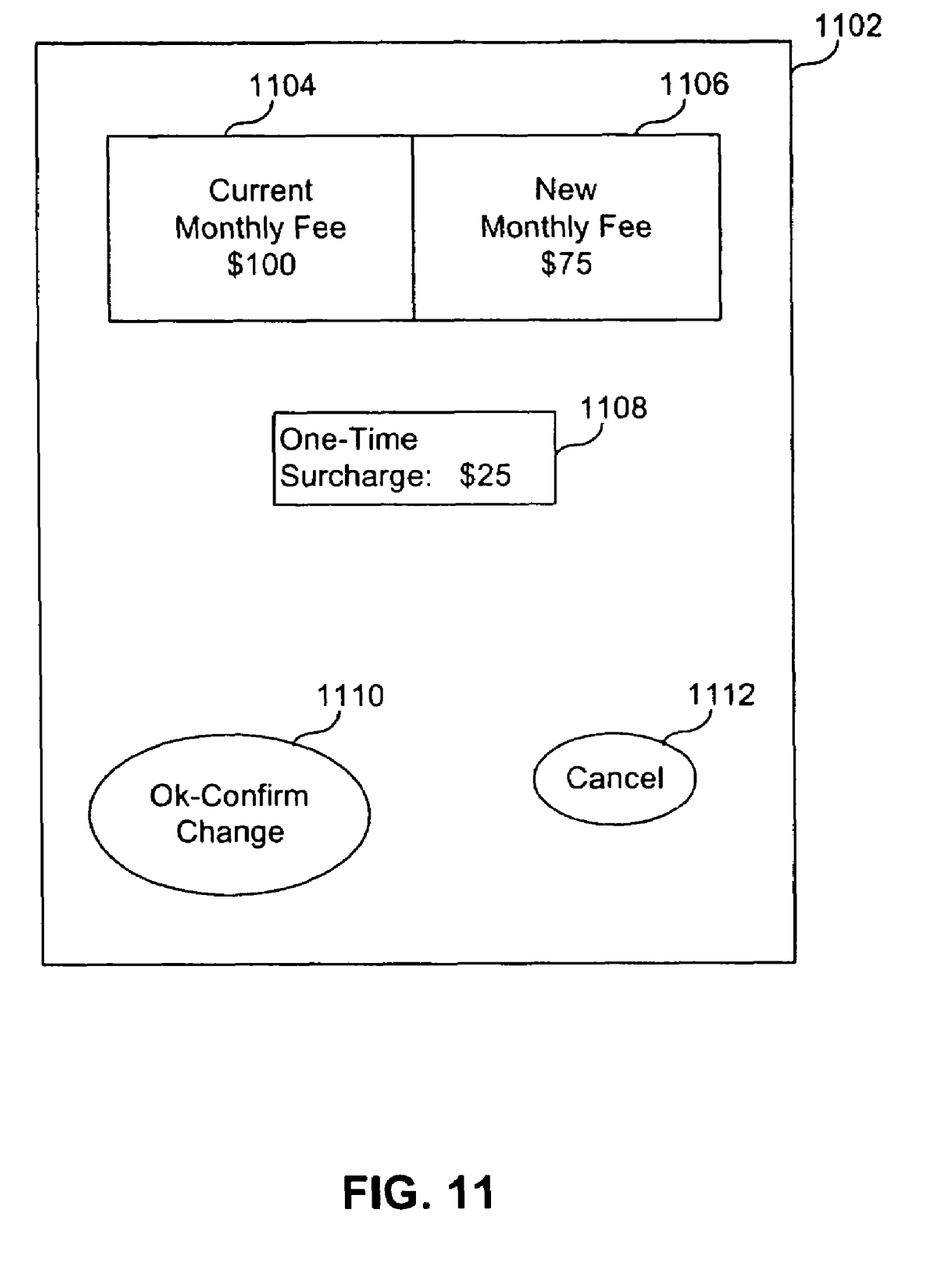

After making the desired changes, the customer 104 presses the submit button 1028, which results in the display of a confirmation window or screen 1102 (FIG. 11). The confirmation screen 1102 displays the charges associated with this change in service. In particular, the confirmation screen 1102 indicates that the current monthly fee will be reduced by $25.00 (from $100 to $75) when these changes are implemented (see fields 1104 and 1106). The confirmation screen 1102 also indicates that there is a one time surcharge of $25.00 (see field 1108) which will be charged to customer 104 if these changes are implemented.

If the customer 104 wishes to cancel these changes, then he presses the cancel button 1112. Otherwise, to confirm the changes, the customer 104 presses the confirm change button 1110. The customer 104's changes are then communicated to the associated service provider(s) 108, who take appropriate action to effect the changes.

Figure 12:
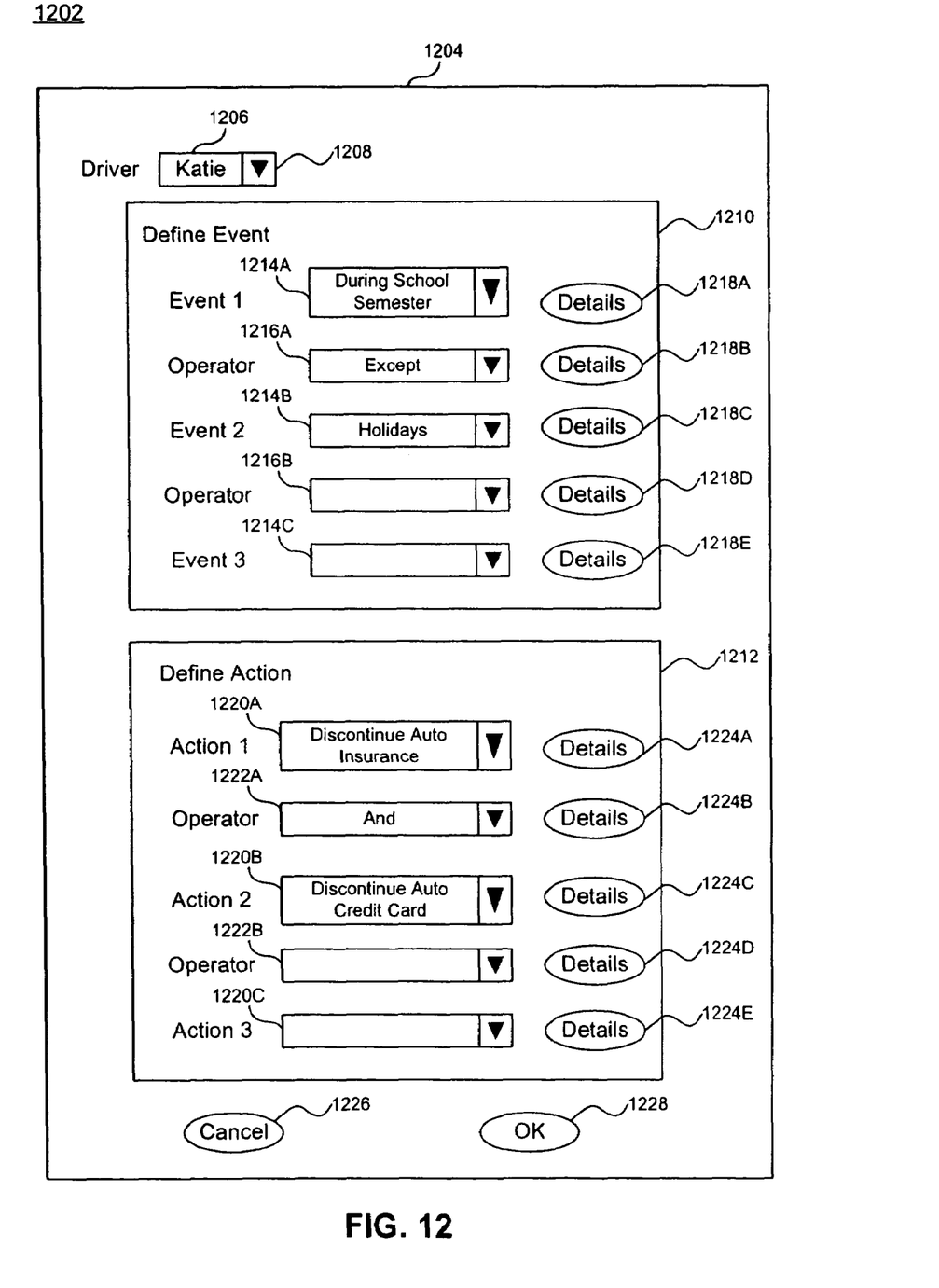

Referring again to FIG. 10, Tab 1012A also includes a define events button 1016 through which the customer 104 can define a Service Adjustment Trigger. FIG. 12 illustrates an example define events window 1204. The define events window 1204 includes a drop-down menu 1208 through which the customer 104 can select a driver.

The define events window 1204 also includes a define event panel 1210 and a define action panel 1212. In the define event panel 1210, the customer 104 can define various events through pull-down menus 1214. Such events may be linked via logical operators in pull-down menus 1216. In the example of FIG. 12, the customer 104 has defined a Service Adjustment Trigger for driver Katie. This Service Adjustment Trigger specifies that some action (that is defined in the define action panel 1212) for "Katie" is to be performed upon the occurrence of:

"During School Semester Except Holidays"

In the define action panel 1212, the customer 104 can define one or more actions that are to be performed by the service provider 1008 upon the occurrence of the event(s) defined in the define events panel 1210. Such actions can be selected via pull-down menu fields 1220, and such actions can be combined via logical fields 1222. In the example of FIG. 12, the customer 104 has indicated that, upon occurrence of the event(s) defined in the define events panel 1210, Katie's automobile insurance should be discontinued (see field 1220A) and Katie's automobile credit card should also be discontinued (see field 1220B).

In some cases, it may be necessary to define some events 1214 in greater detail. In other words, some events 1214 may require additional input from the customer 104 for accurate and complete definition. The same is true for logical operators 1216, 1222, and actions 1220. Accordingly, the defined events window 1204 includes various detail buttons 1218, 1224. Upon the pressing of one of these detail buttons 1218, 1224, a detail window is presented to the customer 104.

Figure 13:
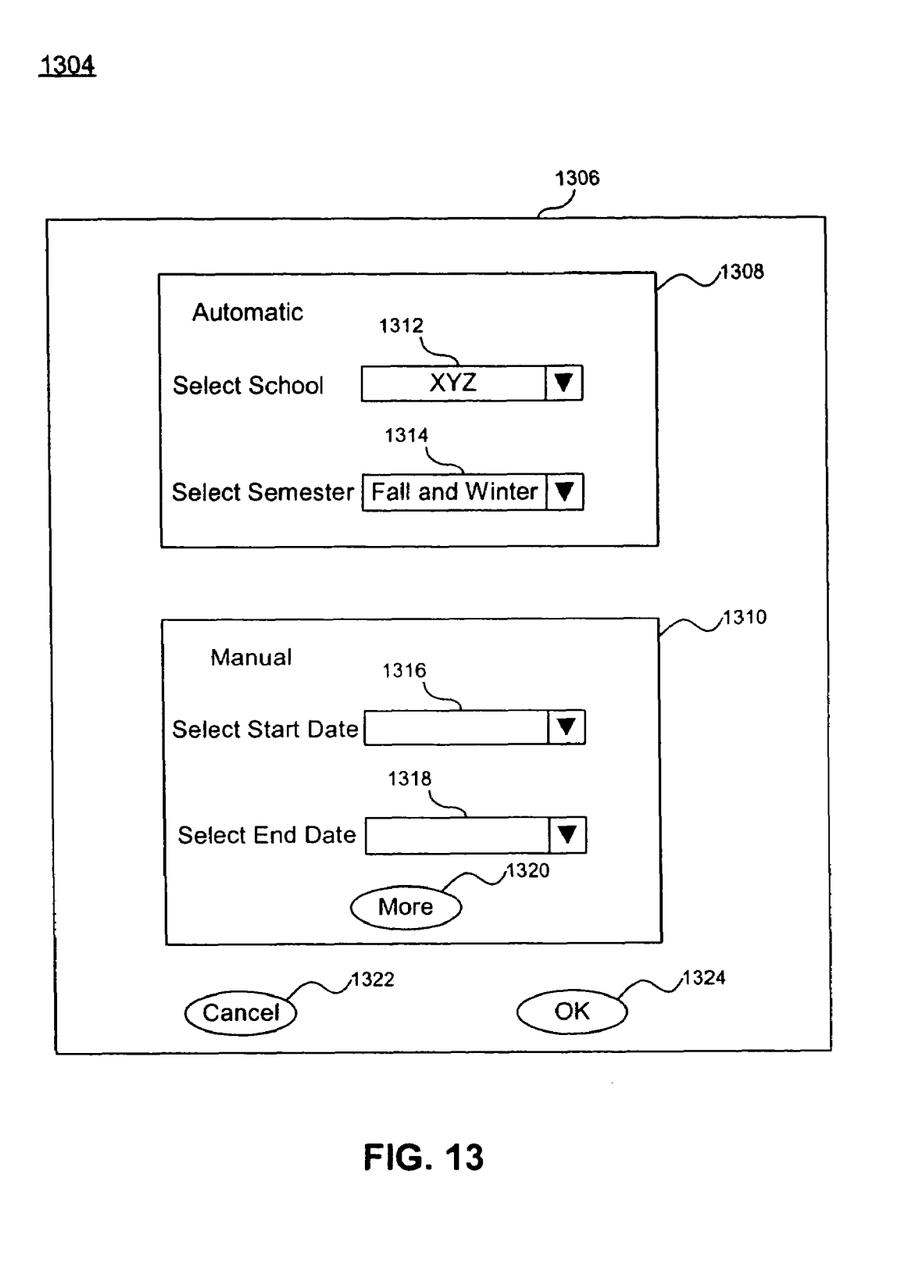

An example detail window 1306 is shown in FIG. 13. The example detail window 1306 corresponds to the pressing of details button 1218A corresponding to the school semester event in field 1214A. The example detail window 1306 includes an automatic definition panel 1308 and a manual definition panel 1310. The automatic detail panel 1308 is used if the customer 104 wishes the service provider 108 to automatically determine the dates associated with the semesters of school XYZ. In field 1312, the customer 104 selects the appropriate school, in this case school XYZ. In field 1314, the customer 104 selects the semesters to act upon. For example, via drop down menu 1314, the customer 104 can select the Fall semester only, the Winter semester only, etc. In the example of FIG. 13, the customer 104 has selected the Fall and Winter semesters of school XYZ. As a result, the service provider 108, when evaluating this trigger, will automatically determine the dates associated with the Fall and Winter semesters of school XYZ. This may be done, for example, by issuing an appropriate query to an appropriate information source 114 (such as the web site of school XYZ).

If, instead, the customer 104 elects to manually define the dates associated with the desired semesters, then the customer 104 enters such dates via a manual panel 1310. The manual panel 1310 includes fields to define a start date 1316 and an end date 1318. Additional periods can be defined by pressing the more button 1320.

Other detail windows, associated with particular events, logical operators, and/or actions, will be apparent to persons skilled in the relevant arts based on the teachings contained here.

Operational Description—Service Provider Perspective

Figure 3:
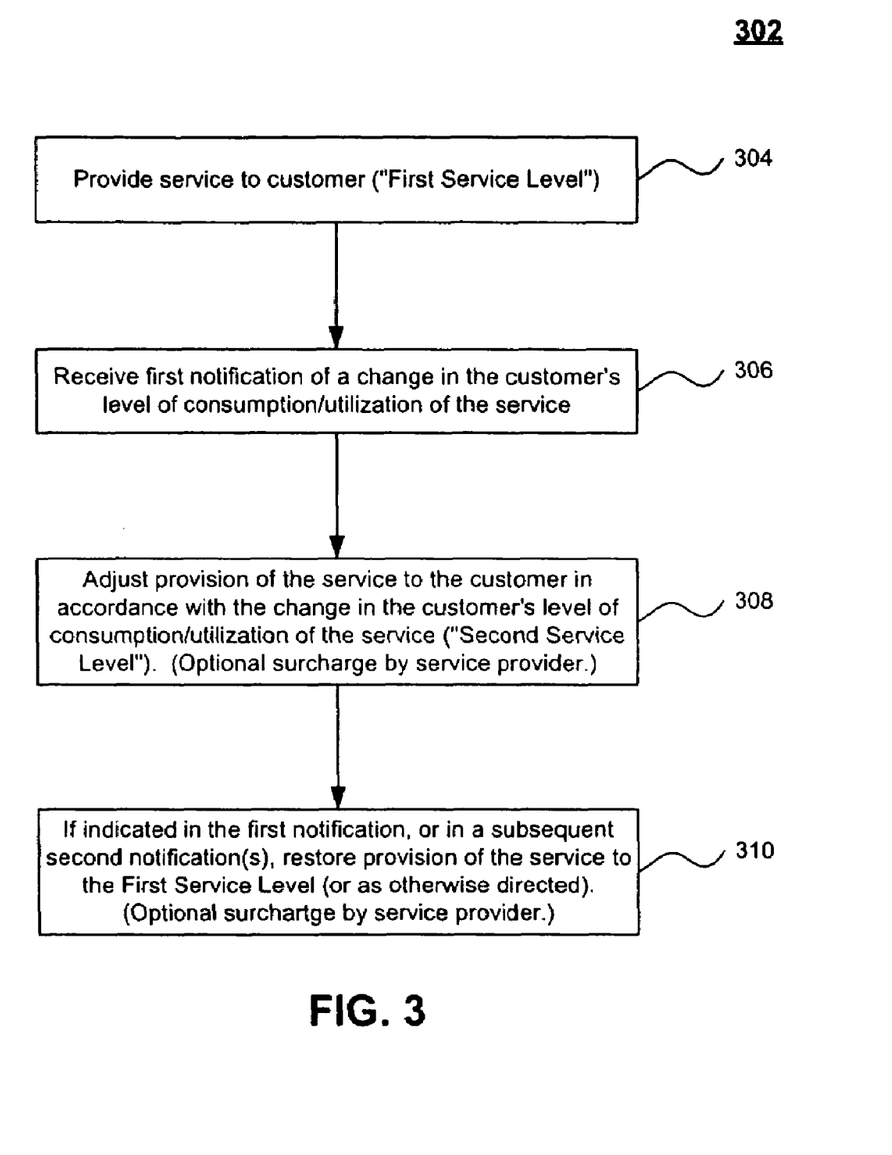

FIG. 3 illustrates a flowchart 302 representing the operation of a service provider 108 in accordance with an embodiment of the invention. In step 304, a service provider 108 provides service to a customer 104, in accordance with a First Service Level (previously defined, for example, in step 204 of FIG. 2).

In step 306, the service provider 108 receives notification of a projected or actual change in the level of consumption/utilization of the service. Such notification may occur when the customer 104 explicitly changes the service level (for example, as in step 208 of FIG. 2). Alternatively, such notification may occur when a Service Adjustment Trigger is activated or invoked, such as the Service Adjustment Triggers discussed in steps 204 and 208 of FIG. 2.

In step 308, the service provider 108 adjusts the level of service to the customer 104 in accordance with the notification discussed in step 306. Such change in the service level to the customer may result in an adjustment to the fee rates applicable to the customer, and/or a surcharge charged to the customer 104.

In step 310, the service provider 108 receives one or more additional notifications to change the customer 104's level of consumption/utilization of the service. Pursuant to such notification(s), the service provider 108 adjusts the level of service provided to the customer 104, in the manner discussed above.

As described above, the service provider 108 modifies the level of service provided to the customer 104 upon the occurrence of various events, which are called Service Adjustment Triggers. Such operation is shown in greater detail in FIG. 4.

Figure 4:
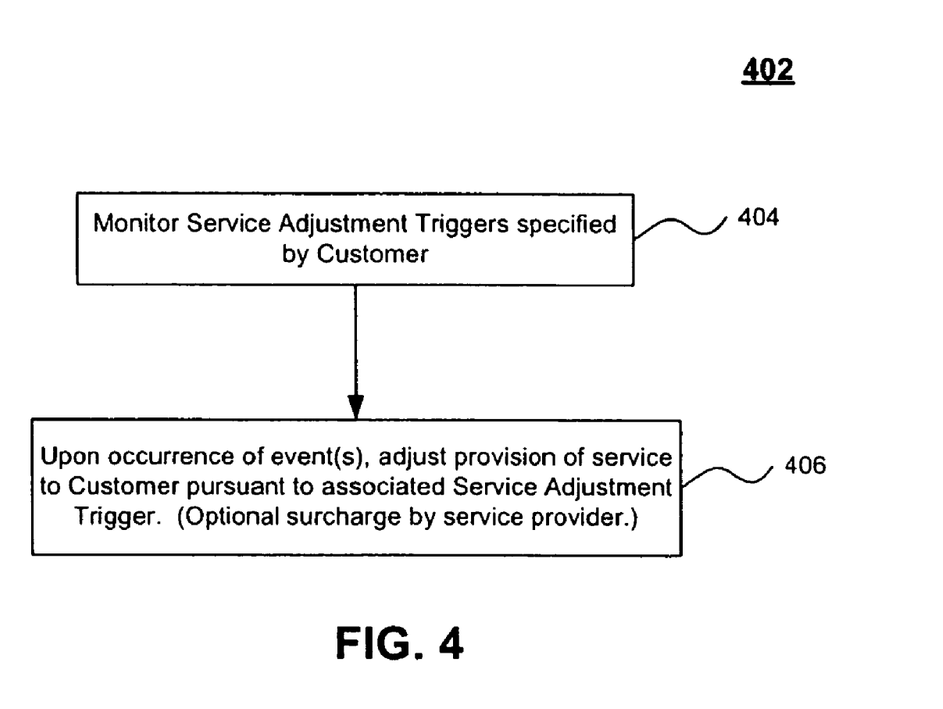

In step 404, the service provider 108 monitors the Service Adjustment Trigger(s), if any, specified by customer 104.

In step 406, upon the occurrence of the events associated with each Service Adjustment Trigger, the service provider 108 adjusts the level of service provided to the customer 104 in the manner defined by the associated Service Adjustment Trigger, and optionally levies a surcharge on the customer 104. The service provider 108 may also modify the rate schedule applicable to the customer 104.

Figure 8:
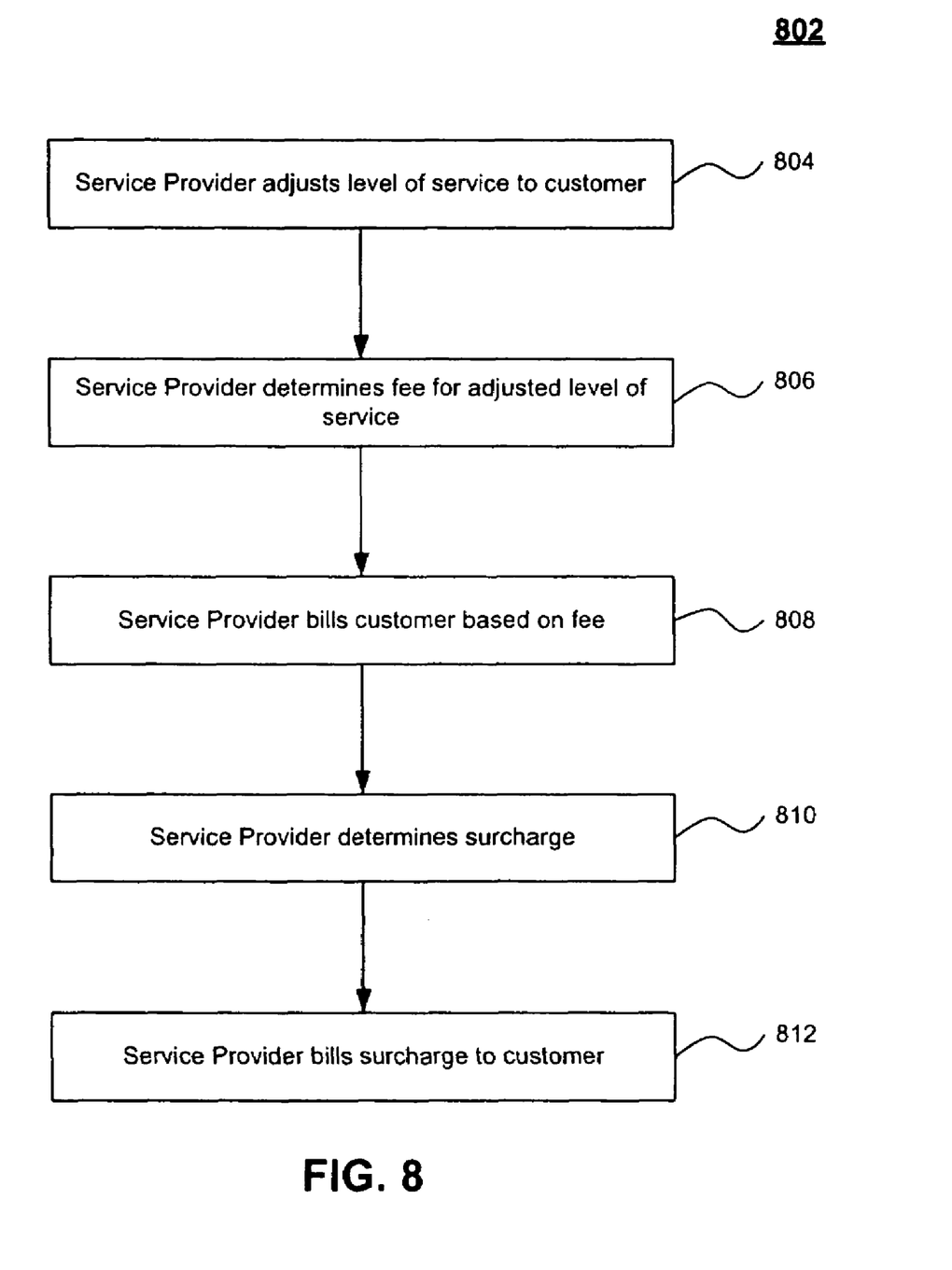

FIG. 8 depicts a flowchart 802 illustrating the operation of the service provider 108 when changing the rate schedule of the customer 104, or levying a surcharge on the customer 104.

In step 804, the service provider 108 adjusts the level of service to the customer 104 (such as in step 308 and/or step 310 of FIG. 3).

In step 806, the service provider 108 determines whether this service change results in a change in the bill or rate schedule applicable to the customer 104. For example, if the service provider 108 (in step 804) discontinues automobile insurance for a member of customer 104's family, then the service provider 108 may determine that the rates charged to the customer 104 should be decreased. This fee/rate adjustment is calculated by the service provider 108 in step 806.

In step 808, the service provider 108 generates a notice or invoice based on the fee calculation of step 806, and communicates same to the customer 104.

In step 810, the service provider 108 determines whether there is a surcharge associated with its operation in step 804.

In step 812, the service provider 108 generates a notice or invoice based on the fee/surcharge calculation of step 810, and communicates same to the customer 104. It is noted that the notices/invoices of steps 808 and 812 may be a single communication.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for providing services via a website, comprising the following steps that are performed by one or more computers:

receiving instructions via a website over a communication network from a user to modify a service being provided, wherein said instructions include a Service Adjustment Trigger that defines one or more conditions for triggering one or more changes to said service and a time period for which the one or more changes are to take effect;

providing a first menu in a Graphical User Interface (GUI) on the website, the first menu adapted to allow a user to select a school and a semester of the school;

receiving a selection of a school and a semester of the school via the first menu on the website, the selection causing the service provider to automatically determine a time period of the selected semester by querying a website of the selected school;

providing a second menu in a GUI on the website, the second menu adapted to allow a user to specify a first action of discontinuing auto insurance for the time period of the selected semester;

providing a third menu in a GUI on the website, the third menu adapted to allow a user to specify a second action of discontinuing a credit card used to pay for auto insurance for the time period of the selected semester;

providing a fourth menu in a GUI on the website, the fourth menu adapted to allow a user to specify a third action of discontinuing an electricity service for a time period if a temperature is greater than a pre-determined temperature during the time period;

receiving a selection of the pre-determined temperature via the fourth menu on the website, the selection causing the website to automatically access a weather website to determine the temperature during the time period; and providing a fifth menu in a GUI on the website, the fifth menu adapted to allow a user to specify a fourth action of discontinuing cable and newspaper delivery services for a specified time period; and modifying using a computer said services pursuant to said instructions.

2. The method of claim 1, further comprising:
calculating whether said modification of said service results in a rate schedule change applicable to said user.

3. The method of claim 1, further comprising:
charging said user a fee for modifying said service pursuant to said instructions.

4. The method of claim 1, further comprising:
charging said user a fee associated with said definition of said Service Adjustment Trigger.

5. The method of claim 1, wherein said modifying step comprises:
determining whether conditions associated with said Service Adjustment Trigger have occurred; and
if said conditions have occurred, then effecting changes to said service associated with said Service Adjustment Trigger.

6. The method of claim 1, further comprising:
calculating whether changes to said service associated with said Service Adjustment Trigger results in a rate schedule change applicable to said user.

7. The method of claim 1, further comprising:
charging said customer a fee for effecting changes to said service associated with said Service Adjustment Trigger.

8. A computer program product comprising a computer useable medium including computer readable instructions stored therein which when executed by a computer cause the computer to implement a method to provide services via a website, the method comprising the steps of:
accessing a service provider website via a communication network, wherein the service provider provides a service to a user;
receiving an input from a user to define instructions via the website to modify said service, wherein said instructions include a Service Adjustment Trigger that defines one or more conditions for triggering one or more changes to said service and a time period for which the one or more changes are to take effect;
providing a first menu in a Graphical User Interface (GUI) on the website, the first menu adapted to allow a user to select a school and a semester of the school;
upon receiving a selection from a user of a school and a semester of the school, automatically determining a time period of the selected semester by querying a website of the selected school;
providing a second menu in a GUI on the website, the second menu adapted to allow a user to specify a first action of discontinuing auto insurance for the time period of the selected semester;
providing a third menu in a GUI on the website, the third menu adapted to allow a user to specify a second action of discontinuing a credit card used to pay for auto insurance for the time period of the selected semester;
providing a fourth menu in a GUI on the website, the fourth menu adapted to allow a user to specify a third action of discontinuing electricity service for a time period if a temperature is greater than a pre-determined temperature during the time period;
receiving a selection of the pre-determined temperature via the fourth menu on the website, the selection causing the website to automatically access a weather website to determine the temperature during the time period; and
providing a fifth menu in a GUI on the website, the fifth menu adapted to allow a user to specify a fourth action of discontinuing cable and newspaper delivery services for a specified time period; and
issuing said instructions to the service provider to modify said service, wherein the service provider implements said one or more changes to said service when said one or more conditions occur.

9. The method of claim 8, further comprising:
calculating whether said modification of said service results in a rate schedule change applicable to said user.

10. The method of claim 8, further comprising:
charging said user a fee for modifying said service pursuant to said instructions.

11. The method of claim 8, further comprising:
charging said user a fee associated with said definition of said Service Adjustment Trigger.

12. The method of claim 8, wherein said modifying step comprises:
determining whether conditions associated with said Service Adjustment Trigger have occurred; and
if said conditions have occurred, then effecting changes to said service associated with said Service Adjustment Trigger.

13. The method of claim 8, further comprising:
calculating whether changes to said service associated with said Service Adjustment Trigger results in a rate schedule change applicable to said user.

14. The method of claim 8, further comprising:
charging said customer a fee for effecting changes to said service associated with said Service Adjustment Trigger.

* * * * *